May 23, 1933.  J. W. MacCLATCHIE  1,910,805
BRAKE
Filed Nov. 18, 1929
Fig.1.
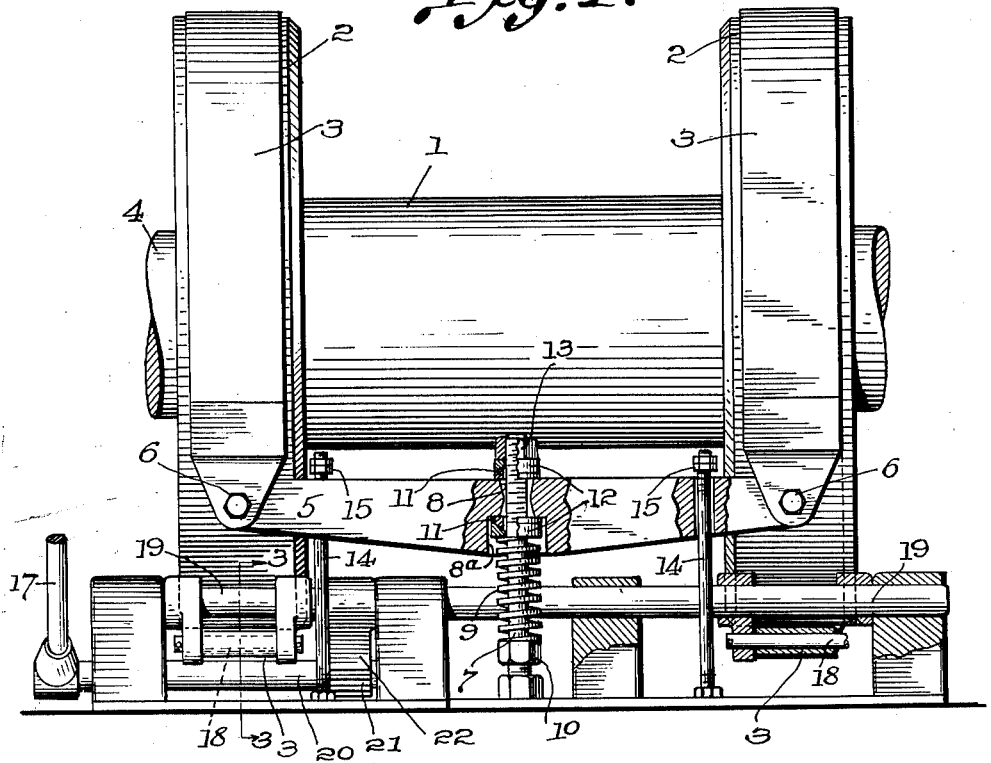
Fig.2.
Fig.3.
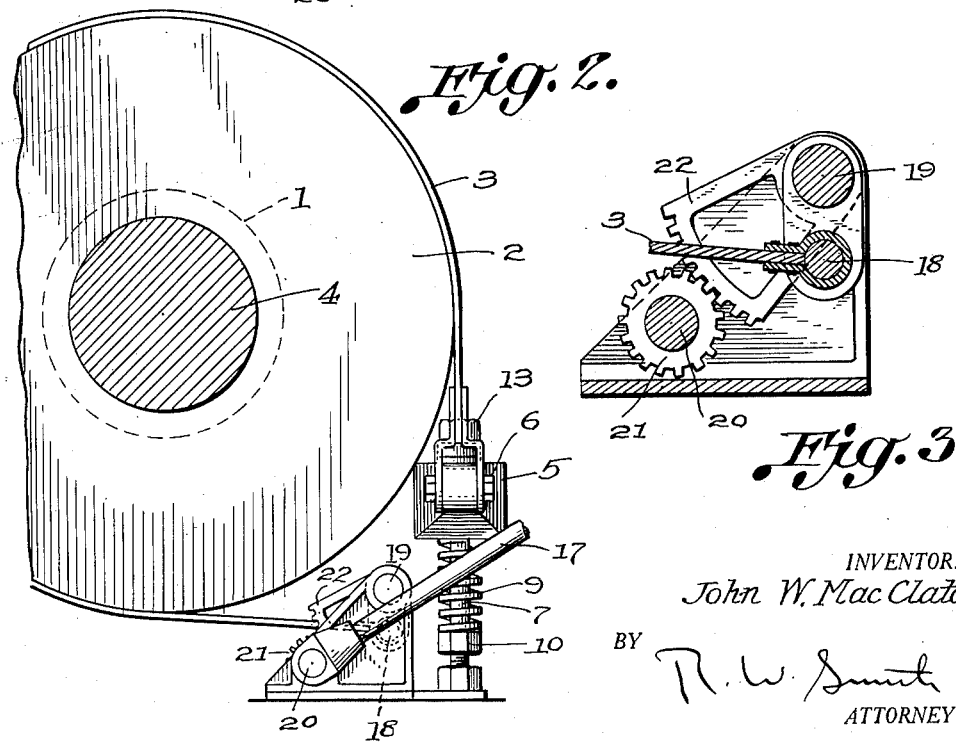
INVENTOR.
John W. MacClatchie
BY
R. W. Smith
ATTORNEY.

Patented May 23, 1933

1,910,805

UNITED STATES PATENT OFFICE

JOHN W. MacCLATCHIE, OF COMPTON, CALIFORNIA

BRAKE

Application filed November 18, 1929. Serial No. 407,951.

This invention relates to brakes for hoisting drums such as are employed in the draw works of well drilling outfits, and it is a principal object of the invention to provide for safety in actuating the brake operating lever.

More particularly it is the object of the invention to operate the brake by a lever actuated reduction gearing providing the desired leverage for setting the brake but reducing the jerking force on the brake lever in the event of such careless handling of the hoisting clutch as otherwise often results in serious accidents due to the violently jerked brake lever striking the operator. By reducing the force with which the brake lever may be accidentally jerked, the power of the resulting throw of the lever may be so reduced as to avoid serious consequences even if the operator is struck.

It is a further object of the invention to equalize the braking action of a multiple-band brake, and to adapt the equalizer for convenient assembly and adjustment and provide the same with wear-resisting bearing elements adapted for ready replacement when worn.

Further objects of the invention will be readily understood from the following description of the accompanying drawing, in which:

Fig. 1 is a front elevation of the brake employed in connection with the hoisting drum of a well drilling outfit.

Fig. 2 is an end view of the brake operating mechanism.

Fig. 3 is a detail section on the line 3—3 of Fig. 1.

The brake may be employed in connection with any hoisting drum or the like, but is particularly applicable and is herein illustrated and described as adapted for use in connection with the drum 1 of a usual draw works for a well drilling outfit. The drum 1 is illustrated as controlled by a pair of brake bands, and for this purpose is provided with brake flanges 2 at its respective ends adapted for engagement by brake bands 3. The drum 1 is mounted on a usual drum shaft 4 of which only a portion is shown, the supporting frame for the drum shaft and the remainder of the draw works being of any usual construction and therefore not illustrated.

The brake bands are fixed at one end so that by drawing upon the opposite ends of the bands they may be tightened on flanges 2 in the usual manner, and the fixed ends of the bands are preferably connected to an equalizer which is adapted to automatically equalize the braking action of the pair of bands. For this purpose the fixed ends of bands 3 are pivoted to the respective ends of a cross-arm 5 as shown at 6, and the arm 5 is pivotally supported medially of its length, preferably by a resiliently yieldable supporting means.

The yieldable pivotal support for the equalizer arm is so constructed as to provide for its ready assembly and adjustment, and for this purpose a screw 7 projects vertically through a bore 8 which opens through the arm 5 medially of its length, and a coil spring 9 is mounted on screw 7 between an adjusting nut 10 and the underside of the equalizer arm which is preferably counterbored as shown at $8^a$. The bore 8 divergently tapers toward its respective ends as shown in Fig. 1 so as to permit rocking of arm 5 with relation to its supporting screw 7, and in order to insure a snug bearing contact between the arm and screw, washers 11 are mounted on the supporting screw and seat respectively against the upper and the counterbored lower side of arm 5, and the outer faces of these washers are convex and engage cooperating concave faces of washers 12 which are also mounted on screw 7, with the opposite flat faces of the washers 12 respectively engaged by the spring 9 and by an adjusting nut 13 which is threaded onto the upper end of screw 7.

The equalizer arm together with its bearing washers and supporting spring are thus readily assembled on screw 7 so as to permit convenient replacement of the washers when worn, and the equalizer arm may be adjusted so as to compensate for wear of the brake bands by simply tightening the nut 13. Rocking movement of arm 5 is preferably limited by safety bolts 14 which project upwardly through the respective ends of the arm and are provided with nuts 15 adapted for threaded adjustment along the bolts so as to form spaced abutments impinged by the arm.

The brake bands are operatively tightened against brake flanges 2 by a pull exerted on the ends of the bands which are remote from the ends fixed to equalizer arm 5, and the pull on the bands may be made by a usual brake lever 17. For this purpose the ends of the bands upon which the pull is exerted are shown connected to crank pins 18 of a shaft 19 which is rocked by lever 17, but instead of the brake lever being fixed directly to shaft 19 as is the usual practice, the present invention provides an operating connection between the lever and shaft for reducing the jerking force of the lever in the event of such careless handling of the hoisting clutch as might otherwise result in serious accidents due to the operator being struck by the violently jerked brake lever.

As an instance of the improved operating connection, reduction gearing may be provided between shaft 19 and a countershaft 20 on which the brake lever 17 is fixed, with the gearing of such ratio that actuating the brake lever will exert increased power for tightening the brake bands, while violent jerking of the brake bands as a result of careless handling of the hoisting clutch, will transmit an appreciably reduced force to the brake lever in order to avoid serious injury even if the operator should be struck. The reduction gearing is shown as a pinion 21 fixed on countershaft 20 and meshing with a segmental gear 22 fixed on shaft 19 and of appreciably greater diameter.

The jerking force on brake lever 17, such as will result from careless handling of the hoisting clutch so as to suddenly throw excessive strain on the drum 1, is thus partially absorbed by the frictional resistance imposed by the gearing 21—22, and furthermore such jerking force is appreciably reduced as a result of the gear ratio providing for decreased power transmission to shaft 20. On the other hand, the brake bands may be set by exerting comparatively little force on lever 17, since the gear ratio provides for increased power transmission from pinion 21 to the gear 22.

The invention thus provides easy operation and uniform distribution of braking pressure, and insures an appreciable factor of safety against the possibility of the brake lever exerting such excessive force as to result in serious injury in the event of the lever striking the operator when suddenly jerked as a result of undue strain on the hoisting cable.

I claim:

1. In combination, a pair of brake bands, an equalizer arm connected at its ends to the respective brake bands, a support extending through the equalizer arm medially of its length, the equalizer arm being slidable along the support and adapted for rocking movement relative thereto, means for adjusting the equalizer axially of the support, and resilient means tending to oppositely axially shift the equalizer arm relative to the support.

2. In combination, a pair of brake bands, an equalizer arm connected at its ends to the respective brake bands, a support extending through the equalizer arm medially of its length, the equalizer arm being slidable along the support and adapted for rocking movement relative thereto, washers on the support having flat faces engaging opposite sides of the equalizer arm, the opposite faces of the washers being convex, cooperating washers on the support having concave faces engaging the convex faces of the first washers, and means for adjusting the second washers axially of the support.

3. In combination, a pair of brake bands, an equalizer arm connected at its ends to the respective brake bands, a support extending through the equalizer arm medially of its length, the equalizer arm being slidable along the support and adapted for rocking movement relative thereto, washers on the support having flat faces engaging opposite sides of the equalizer arm, the opposite faces of the washers being convex, cooperating washers on the support having concave faces engaging the convex faces of the first washers, the opposite faces of the second washers being flat, an abutment engaging the flat face of one of said second washers and adapted for axial adjustment relative to the support, and resilient means engaging the flat face of the other of said second washers and adapted to tension the same axially of the support.

4. In combination, a pair of brake bands, an equalizer arm connected at its ends to the respective brake bands, a support extending through the equalizer arm medially of its length, the equalizer arm being slidable along the support and adapted for rocking movement relative thereto, washers on the support having flat faces engaging opposite sides of the equalizer arm, the opposite faces of the washers being convex, cooperating washers on the support having concave faces engaging the convex faces of the first washers, the opposite faces of the second washers being flat, a nut threaded on the support and engaging the flat face of one of said second washers, a spring mounted on the support and engaging the flat face of the other of said second washers for tensioning said washer axially of the support, and means for adjusting the tension of the spring.

5. In combination, a pair of brake bands, a medially pivoted cross arm connected to ends of the brake bands at the respective ends of said cross arm, a shaft having crank pins connected to the opposite ends of the brake bands, a countershaft, a brake lever fixed to the countershaft, a pinion fixed on the countershaft, and a gear of relatively greater diameter fixed on the crank pin shaft and meshing with the pinion.

6. In combination, a pair of brake bands, an equalizer arm connected at its ends to the respective brake bands, a support extending through the equalizer arm medially of its length, the equalizer arm being slidable along the support and adapted for rocking movement relative thereto, means for yieldably shifting the equalizer arm in one direction along the support, and a stop limiting said shifting of the equalizer arm along the support.

7. In combination, a pair of brake bands, an equalizer arm connected at its ends to the respective brake bands, a support engaging the equalizer arm medially of its length and adapted for rocking of the equalizer arm relative thereto, means for yieldably shifting the equalizer arm in one direction along the support, and a stop limiting said shifting of the equalizer arm along the support.

8. In combination, a pair of brake bands, an equalizer arm connected at its ends to the respective brake bands, a support engaging the equalizer arm medially of its length and adapted for rocking of the equalizer arm relative thereto, means for adjusting the equalizer axially of the support, and resilient means tending to oppositely axially shift the equalizer arm relative to the support.

9. In combination, a pair of brake bands, means connected to one end of each of the brake bands for equalizing actuation of the brake bands, actuating means secured to the opposite ends of the brake bands, a gear rotatable for operating the actuating means, a rotatable pinion of relatively smaller diameter meshing with the gear for rotating the gear by rotation of the pinion, and a lever for rotating the pinion.

10. In combination, a pair of brake bands, means connected to one end of each of the brake bands for equalizing actuation of the brake bands, a brake lever, and gearing forming a power increasing operating connection between the brake lever and the opposite ends of the brake bands, said power increasing operating connection actuating said opposite ends of the brake bands in the same direction.

In testimony whereof I affix my signature.

JOHN W. MacCLATCHIE.